(12) United States Patent
von Eicken et al.

(10) Patent No.: US 7,898,968 B2
(45) Date of Patent: Mar. 1, 2011

(54) SYSTEMS AND METHODS FOR SELECTING EFFICIENT CONNECTION PATHS BETWEEN COMPUTING DEVICES

(75) Inventors: Thorsten von Eicken, Santa Barbara, CA (US); Stefan Karpinski, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 826 days.

(21) Appl. No.: 11/532,414

(22) Filed: Sep. 15, 2006

(65) Prior Publication Data

US 2008/0069104 A1 Mar. 20, 2008

(51) Int. Cl.
*G01R 31/08* (2006.01)

(52) U.S. Cl. ........................................ 370/248; 370/400

(58) Field of Classification Search .................. 370/216, 370/389, 231, 235, 248, 392, 400, 401
See application file for complete search history.

(56) References Cited

U.S. PATENT DOCUMENTS

| | | | |
|---|---|---|---|
| 5,307,490 | A | 4/1994 | Davidson et al. |
| 5,561,769 | A | 10/1996 | Kumar et al. |
| 5,623,601 | A | 4/1997 | Vu et al. |
| 5,961,588 | A | 10/1999 | Cooper et al. |
| 5,999,525 | A | 12/1999 | Krishnaswamy et al. |
| 6,006,264 | A | 12/1999 | Colby et al. |
| 6,275,942 | B1 | 8/2001 | Bernhard et al. |
| 6,295,276 | B1 | 9/2001 | Datta et al. |
| 6,493,341 | B1 | 12/2002 | Datta et al. |
| 6,606,744 | B1 | 8/2003 | Mikurak |
| 6,671,818 | B1 | 12/2003 | Mikurak |
| 6,909,708 | B1 | 6/2005 | Krishnaswamy et al. |
| 7,020,719 | B1 | 3/2006 | Grove et al. |
| 7,054,314 | B2 * | 5/2006 | Abdollahi et al. ........... 370/392 |
| 7,124,101 | B1 | 10/2006 | Mikurak |
| 7,130,807 | B1 | 10/2006 | Mikurak |
| 7,299,489 | B1 * | 11/2007 | Branigan et al. ................ 726/2 |
| 7,398,552 | B2 | 7/2008 | Pardee et al. |
| 7,554,983 | B1 * | 6/2009 | Muppala ..................... 370/392 |

(Continued)

FOREIGN PATENT DOCUMENTS

EP 0540151 5/1993

OTHER PUBLICATIONS

Rosen et al., "RFC 2547 BGP/MPLS VPNS", Mar. 1999, p. 1.*

*Primary Examiner*—Jayanti K Patel
*Assistant Examiner*—Jung Park
(74) *Attorney, Agent, or Firm*—McDermott Will & Emery LLP

(57) ABSTRACT

A method for determining a communication path between a first computing device and a second computing comprises: receiving, at a second computing device, a plurality of IP addresses for a first computing device; establishing a primary connection between the first and second computing devices using a first one of the plurality of IP addresses; transmitting, from the second computing device, a plurality of probe messages to each of the plurality of IP addresses; receiving, at the second computing device from the plurality of IP addresses, a plurality of responses to the plurality of probe messages; selecting one of the plurality of IP addresses for future communications between the first to the second computing device, and transferring the primary connection between the first and second computing devices to the selected IP address. Corresponding systems are also described.

24 Claims, 5 Drawing Sheets

U.S. PATENT DOCUMENTS

| | | |
|---|---|---|
| 2002/0038360 A1* | 3/2002 | Andrews et al. ............ 709/223 |
| 2002/0150041 A1* | 10/2002 | Reinshmidt et al. ......... 370/216 |
| 2003/0009295 A1* | 1/2003 | Markowitz et al. ............ 702/20 |
| 2004/0199627 A1* | 10/2004 | Frietsch ...................... 709/224 |
| 2005/0050316 A1 | 3/2005 | Peles |
| 2005/0135369 A1* | 6/2005 | Galand et al. ............... 370/392 |
| 2005/0286466 A1 | 12/2005 | Tagg et al. |
| 2006/0114911 A1* | 6/2006 | Nguyen ................... 370/395.4 |
| 2006/0182034 A1* | 8/2006 | Klinker et al. .............. 370/238 |
| 2006/0187820 A1* | 8/2006 | French ....................... 370/227 |
| 2007/0109991 A1* | 5/2007 | Bennett ...................... 370/328 |
| 2007/0214283 A1* | 9/2007 | Metke et al. ................ 709/245 |
| 2008/0198767 A1* | 8/2008 | Lebrun et al. ............... 370/254 |
| 2008/0320151 A1 | 12/2008 | McCanne et al. |

* cited by examiner

SYSTEMS AND METHODS FOR SELECTING EFFICIENT CONNECTION PATHS BETWEEN COMPUTING DEVICES

FIELD OF THE INVENTION

The present invention relates to computer networking technologies, and more specifically to means for selecting efficient communication paths between two devices on a network using a series of probe messages sent to a number of IP addresses corresponding to a given server in order to determine the most efficient connection path to the server.

BACKGROUND OF THE INVENTION

In order to improve reliability and performance, a server on a network may be set up with multiple IP addresses. Each IP address may correspond to a different potential route to the server. For example, each IP address may correspond to a different network service provider. Many large internet sites have multiple routes and connections to multiple network providers. One way to manage these multiple routes is to hide the routes from devices connecting to the sites. A site may determine a particular IP address to use for routing requests from a given subnet, but hide all other IP addresses from that subnet.

However, this approach suffers from the drawback that any routing control is necessarily coarse. If a server begins using a different IP address for an entire subnet, large numbers of existing connections and clients may be affected. Thus there exists a need to leverage multiple IP addresses and routes to provide optimal connections to clients on a per-client basis.

SUMMARY OF THE INVENTION

In one aspect, the present invention relates to a method for determining a communication path between a first computing device and a second computing device. The method comprises: receiving, at a second computing device, a plurality of IP addresses for a first computing device; establishing a primary connection between the first and second computing devices using a first one of the plurality of IP addresses; transmitting, from the second computing device, a plurality of probe messages to each of the plurality of IP addresses; receiving, at the second computing device from the plurality of IP addresses, a plurality of responses to the plurality of probe messages; selecting one of the plurality of IP addresses for future communications between the first to the second computing device, and transferring the primary connection between the first and second computing devices to the selected IP address.

In a second aspect, the present invention relates to a second method for determining a communication path between a first computing device and a second computing device. The method comprises: establishing a primary connection between a first computing device having a plurality of addresses associated therewith and a second computing device using a first one of the plurality of IP addresses of the first computing device; transmitting, from each of the plurality of IP addresses to the second computing device, a plurality of probe messages; receiving, at the second computing device, the plurality of probe messages; and selecting, based on an analysis of the received probe messages, one of the plurality of IP addresses for future communications between the first to the second computing device.

In a third aspect, the present invention relates to a system for determining a communication path between a first computing device and second computing device, the system comprising: a first computing device having a plurality of IP addresses that define the location of the first computing device on a network, including a responder configured to respond to a message received at each of the plurality of IP addresses; a second computing device in communication with the first computing device via the network using one of the IP addresses of the first computing device to establish a primary connection, a receiver for receiving the known IP addresses, and a transmitter for transmitting a probe message to each of the known IP addresses; and a determination module in communication with at least one of the first computing device and the second computing device, the determination module configured to receive a response to each of the probe messages from each of the known IP addresses and transfer the primary connection to another of the known IP addresses of the first computing device when the determination module determines from the responses to the probe messages indicates another one of the known IP addresses exceeds a predetermined performance characteristic.

In a fourth aspect, the present invention relates to computer readable instructions for executing any of the described methods.

BRIEF DESCRIPTION OF THE DRAWINGS

The foregoing and other objects, aspects, features, and advantages of the invention will become more apparent and better understood by referring to the following description taken in conjunction with the accompanying drawings, in which.

The features and advantages of the present invention will become more apparent from the detailed description set forth below when taken in conjunction with the drawings.

DETAILED DESCRIPTION OF THE INVENTION

Figure 1:
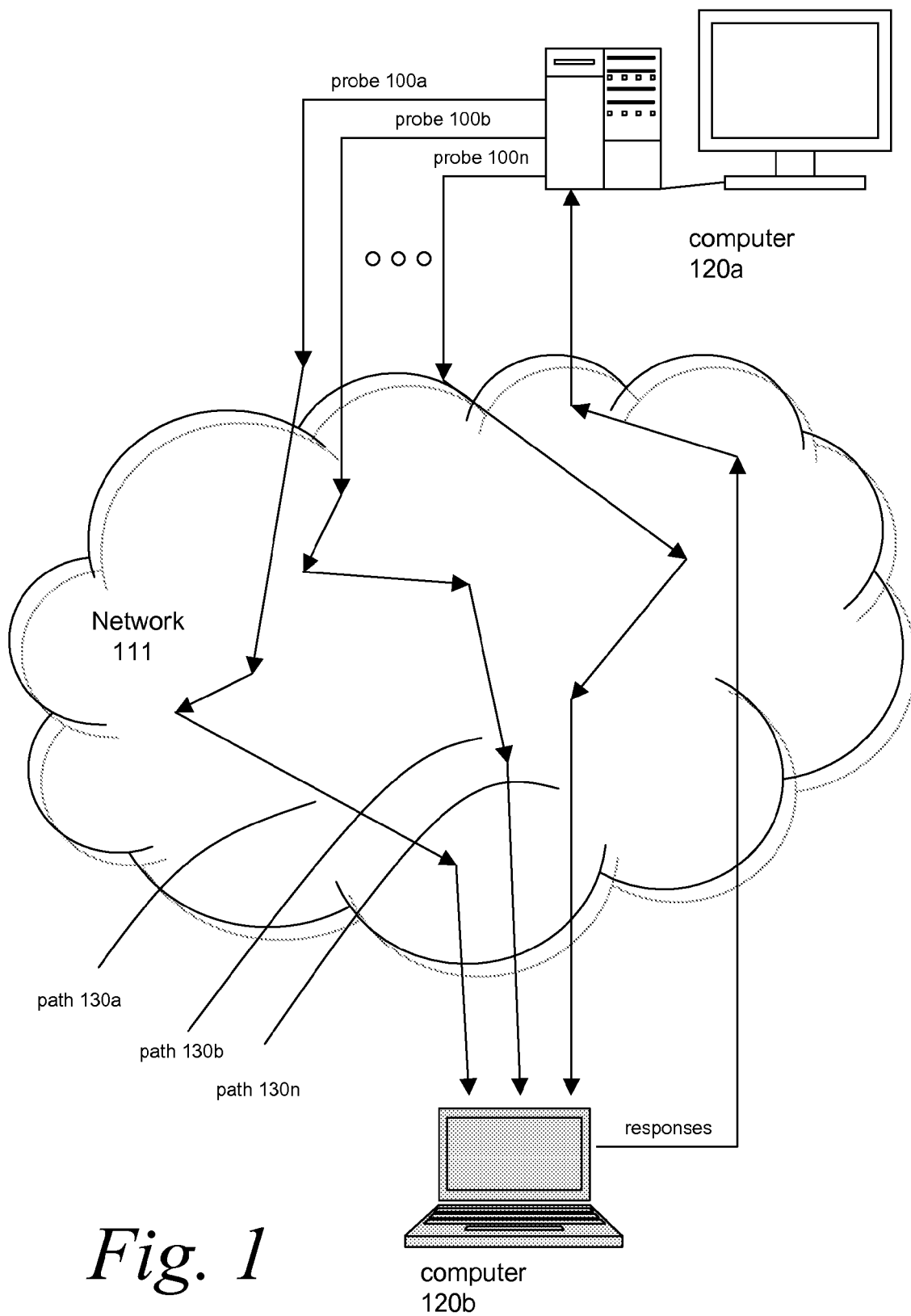
FIG. 1 is a block diagram of a network in which a communication path is determined between a first and second computing device.

Referring now to FIG. 1, a block diagram of a network in which a communication path is determined between a first and second computing device is shown. In brief overview, two computers 120a, 120b are connected via a network 111. The computer 120a transmits a number of probes 100a 100b, . . . 100n (generally 100) to the computer 120b. The probes are addressed to different IP addresses corresponding to the computing device 120b, and thus each probe 100 may travel a different path 130a, 130b, 130n (generally 130) within the network 111 before arriving at the computing device 120b. The computer 120b may then respond to the received probes, and the probes 100 and responses may be analyzed to determine the most efficient network path.

Still referring to FIG. 1, now in greater detail, the two computers may comprise any computing device capable of processing, sending, and receiving information. Examples of computing devices include without limitation personal computers, laptop computers notebook computers, personal digital assistants, cellular phones, servers, routers, and databases.

The network 111 may comprise one or more personal area networks (PAN), local-area networks (LAN), a medium-area networks (MAN), and wide area networks (WAN) such as the Internet or the World Wide Web. The network 111 may comprise any connections including standard telephone lines, LAN or WAN links (e.g., T1, T3, 56 kb, X.25), broadband connections (e.g., ISDN, Frame Relay, ATM), and wireless connections (e.g., IEEE 802.11 and Bluetooth). The computers 120 may communicate through the network 111 using any communication protocol, including without limitation TCP/IP, IPX, SPX, NetBIOS, NetBEUI, SONET, SDH, and direct asynchronous protocols. The protocols used to communicate through the network 111 can include any variety of protocols used for long haul or short transmission. The network 111 may comprise mobile telephone networks utilizing any protocol or protocols used to communicate among mobile devices, including AMPS, TDMA, CDMA, GSM, GPRS or UMTS. In some embodiments, different probes may be transmitted via different protocols. The networks 111 may comprise the Internet. As used herein, Internet refers to the electronic communications network that connects computer networks and organizational computer facilities around the world.

The first computer 120*a* may send a plurality of probes to the second computer. Each probe may be addressed to a different IP address corresponding to the second computer. In some embodiments the probes 100 and responses may be transmitted via a standard public network protocol, such as TCP or UDP. In other embodiments the probes 100 and responses may be transmitted via a proprietary protocol. In still other embodiments, the probes 100 and responses may be transmitted via a combination of public and proprietary protocols. In some cases, the probes 100 may each travel a different path 130 through the network 111 to reach the second computer 120*b*. In some cases, two or more paths 130 may share one or more hops. In other cases, two or more paths 130 may have no hops in common. In some cases, two paths 130 may each pass through a different set of subnetworks. In other cases, two paths 130 may pass through identical sets of subnetworks.

In some embodiments, one or more responses may travel the same path 130 as one or more probes 120. In other embodiments, two or more responses may travel the same path as each other. In still other embodiments, two or more responses may each travel a different path.

The first or second computer 120 may then analyze the probes or the probe responses to select an optimal IP address for future communications. Any statistical technique or techniques may be used to select the optimal IP address. In some embodiments, the first computer may send out multiple series of probes 100, and analyze the results over time. In other embodiments, the first computer may continually or repeatedly make determinations of the optimal IP address to use in communicating with the second computer.

The computers 120 can communicate directly with each other or through an intermediary computing or communication device. For example, in some embodiments a communication server may facilitate communications between the first and second computing devices. The communications server can provide a secure channel using any number of encryption schemes to provide communications between the viewer 120 and the host 110. One remote access product that currently uses such a communication scheme is GOTOMYPC offered by Citrix Online, LLC of Santa Barbara Calif. Certain aspects and features of the invention described below can be embodied in such a service. Other services that can include features of the invention can include, but are not limited too, CITRIX METAFRAME, provided by Citrix Systems, Inc. of Ft. Lauderdale Fla., WEBEX PCNOW offered by WebEx Communications, Inc. of Santa Clara Calif., LOGMEIN offered by 3am Labs, Inc. of Woburn, Mass., REMOTELY ANYWHERE also offered by 3am Labs, and PROVISION MANAGEMENT FRAMEWORK offered by Provision Networks.

Figure 2A:
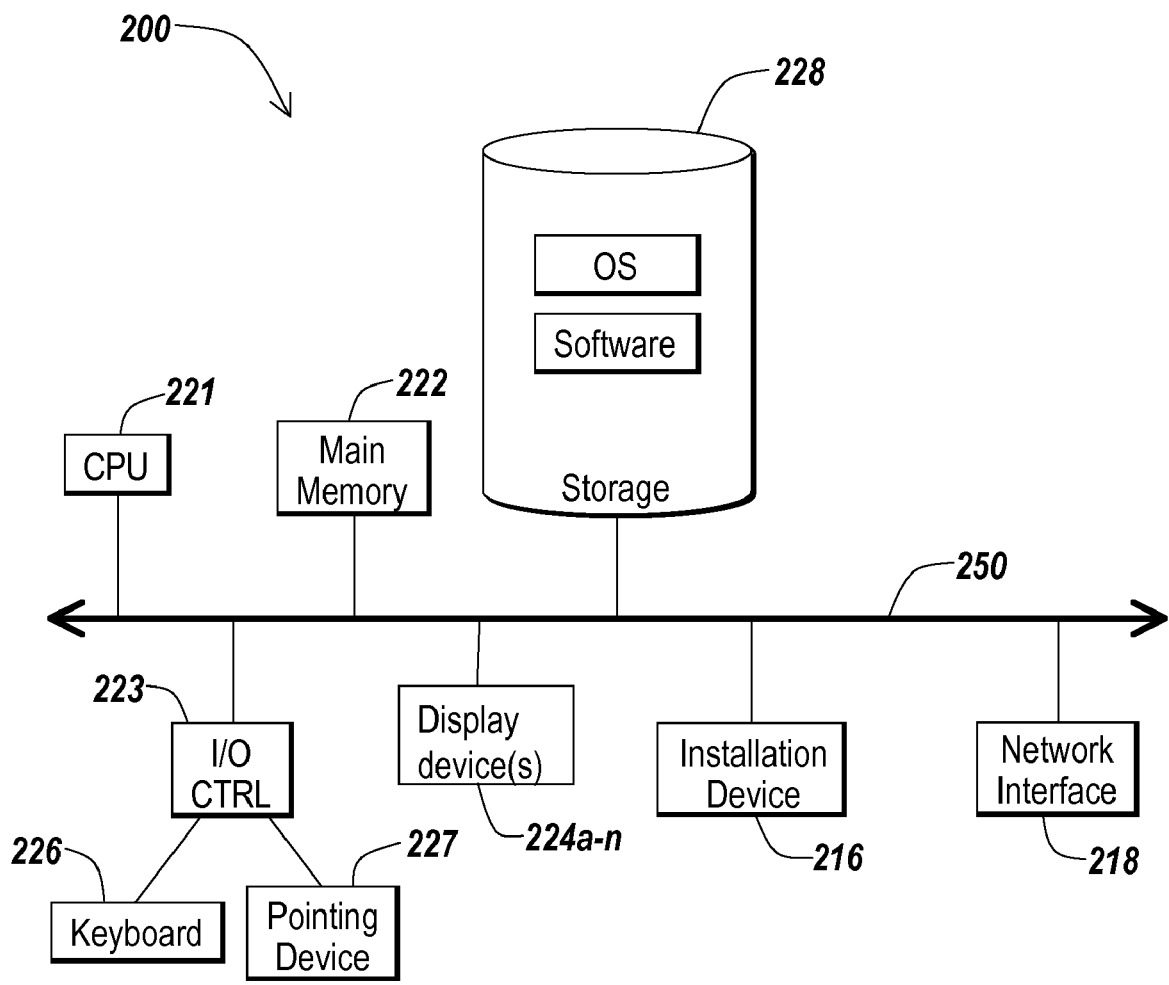
FIGS. 2A and 2B depict block diagrams of a typical computer useful as a first or second computing device.
Figure 2B:
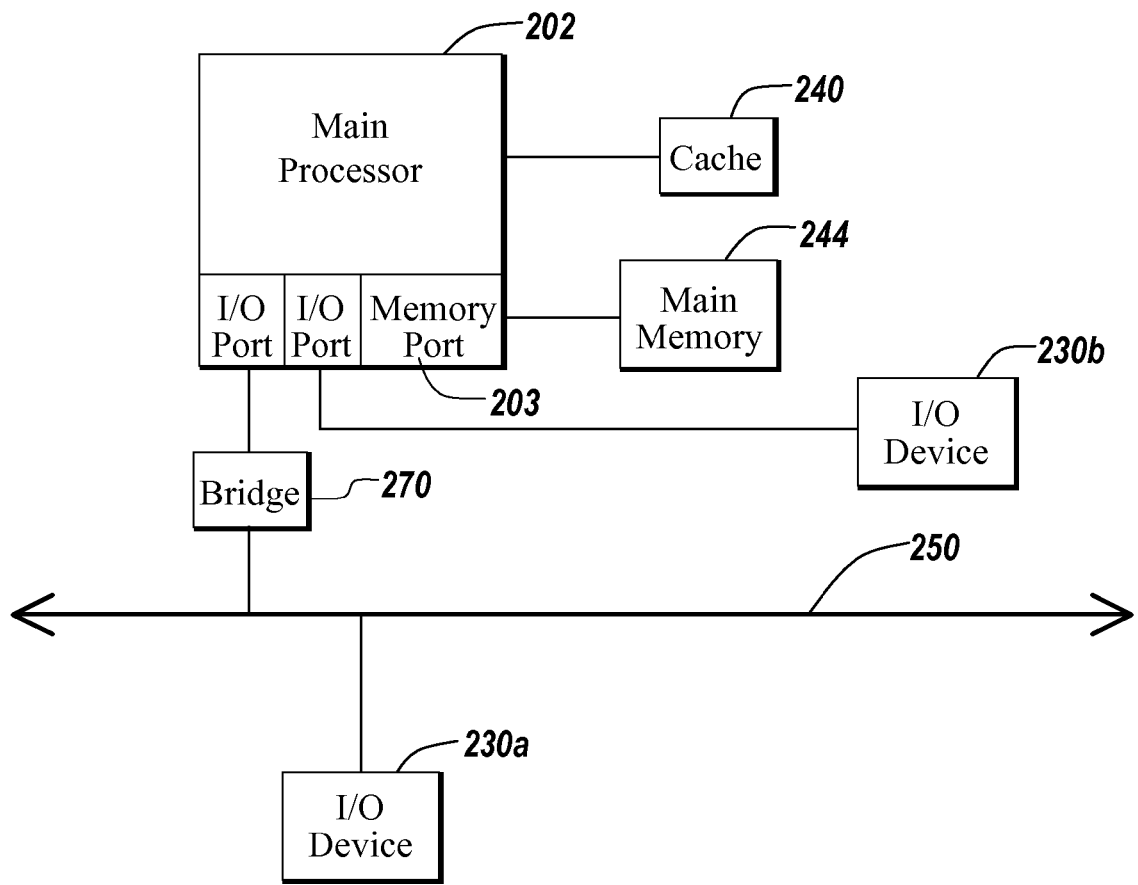

FIGS. 2A and 2B depict block diagrams of a typical computer 200 useful as a first or second computing device. As shown in FIGS. 2A and 2B, each computer 200 includes a central processing unit 202, and a main memory unit 204. Each computer 200 may also include other optional elements, such as one or more input/output devices 230*a*-230-*b* (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 250 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 250. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230*b* via HyperTransport, Rapid I/O, or InfiniBand. FIG. 2B also depicts an embodiment in which local busses and direct communication are mixed: the processor 202 communicates with I/O device 230*a* using a local interconnect bus while communicating with I/O device 230*b* directly.

A wide variety of I/O devices 230 may be present in the computer system 200. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, California. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, California; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 2A and 2B, including the processor 202 and the main memory 204.

Figure 3:
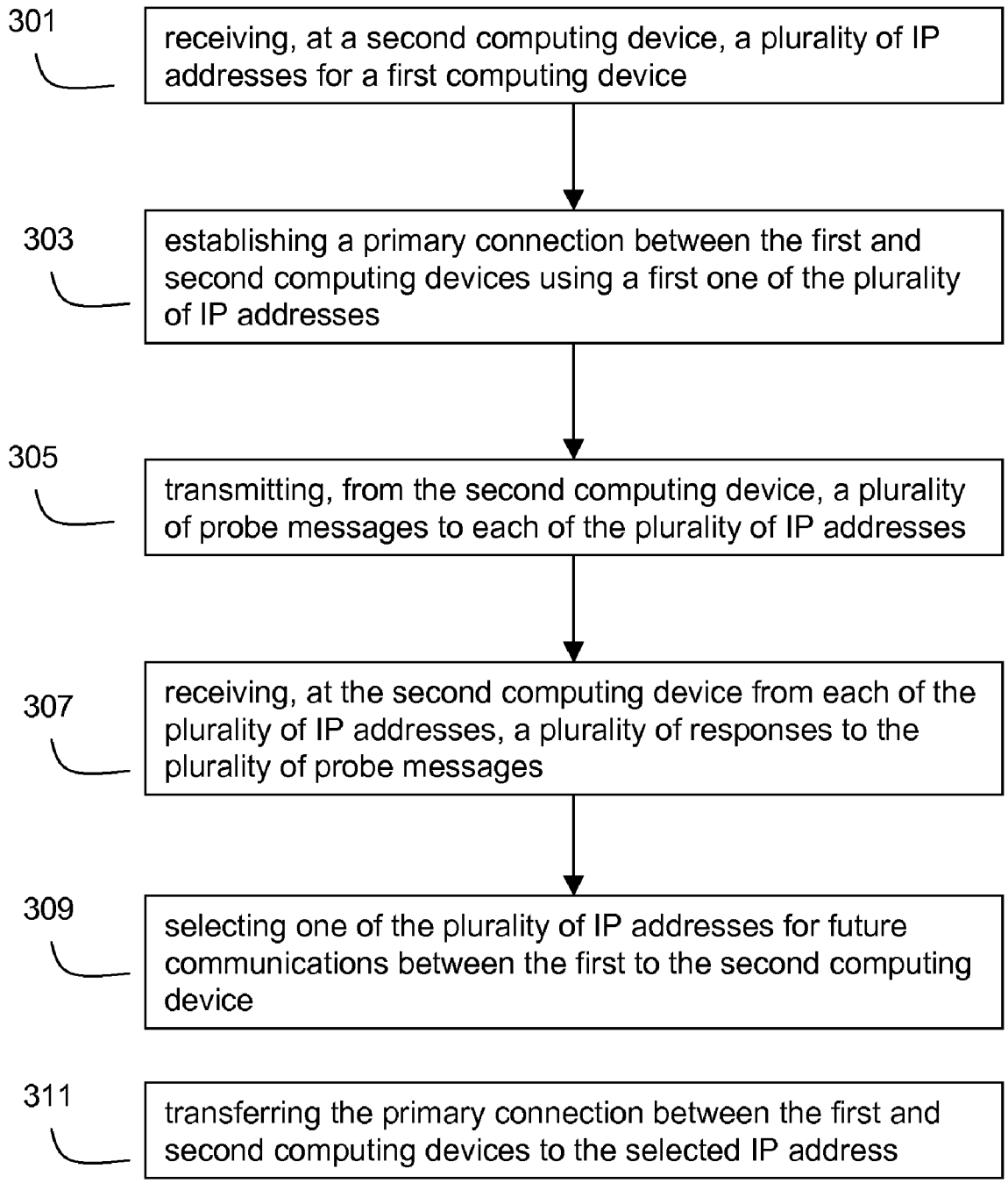
FIG. 3 is a flow diagram of one embodiment of a method for determining a communication path between a first computing device and a second computing device.

Referring now to FIG. 3, one embodiment of a method for determining a communication path between a first computing device and a second computing device is shown. In brief overview, the method comprises: receiving, at a second computing device, a plurality of IP addresses for a first computing device (step 301); establishing a primary connection between the first and second computing devices using a first one of the plurality of IP addresses (step 303); transmitting, from the second computing device, a plurality of probe messages to each of the plurality of IP addresses (step 305); receiving, at the second computing device from the plurality of IP addresses, a plurality of responses to the plurality of probe messages (step 307); selecting one of the plurality of IP addresses for future communications between the first to the second computing device (step 309) and transferring the primary connection between the first and second computing devices to the selected IP address (step 311).

Still referring to FIG. 3, now in greater detail, the method comprises receiving, at a second computing device, a plurality of IP addresses for a first computing device. In some embodiments, the plurality of IP addresses may each be received at substantially the same time. In other embodiments, the plurality of IP addresses may each be received at separate times.

In one embodiment, each IP address may correspond to a different service provider or intermediate network 112. For example, a service provider with a given server 120 may have contracts with multiple ISPs for data transmission, and receive, for the server, a different IP addresses from each ISP. An ISP may be any entity which offers internet connectivity and associated services relating to the sending and receiving of data via the internet. Examples of ISPs include AT&T, MCI, Sprint, Global Crossing, Verio, Teleglobe, Cogent, France Telecom, and SBC, among others. Each IP address may be routed differently according to the routing and network topologies of the ISPs, and therefore have different connection properties, such as bandwidth, latency, and reliability.

After receiving, at a second computing device, a plurality of IP addresses for a first computing device (step 301); a primary connection may be established between the first and second computing devices using a first one of the plurality of IP addresses (step 303). In some embodiments, the primary connection may be initiated and established by the first computing device. In other embodiments, the primary connection may be initiated and established by the second computing device. The primary connection may comprise any type of connection, and may occur at any network layer, including the network layer, transport layer, session layer, presentation layer, and application layer. The primary connection may involve the transfer of any type and amount of data, including files, web pages, streaming services, applications, graphical data, and interactive content. In some embodiments, a plurality of connections may be established between the first and second computing devices using a first one of the plurality of IP addresses.

After establishing a primary connection between the first and second computing devices using a first one of the plurality of IP addresses (step 303); the second computing device may transmit a plurality of probe messages to each of the plurality of IP addresses (step 305). In some embodiments, the second computing device may transmit the plurality of probe messages prior to or before establishing the primary connection. The probe messages may be transmitted using any protocol. In some embodiments, the probe messages may comprise UDP packets. In other embodiments, the probe messages may comprise IP packets. In still other embodiments, the probe messages may comprise TCP packets. In some embodiments, the probe messages may comprise a second protocol layered on top of one or more IP packets. In some embodiments, the second computing device may transmit the plurality of probe messages during the establishment of the primary connection.

The probe messages may comprise any information relating to tracking network performance. In one embodiment, the probe messages may comprise a serial number such that the first and second computing devices may track individual probes. This serial number may be specified in any manner. In some embodiments, the serial number may comprise a 4 byte number. In other embodiments the serial number may comprise any other number of bits or bytes. In some embodiments, the serial number may comprise a timestamp. In some embodiments, the second computing device may store a serial number which is assigned to a probe, and then incremented by 1 before being assigned to the next transmitted probe. In this way each probe is assigned a unique serial number. Though the serial numbers may wrap around, the serial number space may be chosen large enough so that at any given time, no two outstanding probes have the same serial number. In other embodiments, the second computer may assign all of the probes transmitted at a given time the same serial number. Each successive batch of probes would then receive a successive serial number.

In some embodiments, the second computer may transmit the plurality of probes at substantially the same time. For example, all of the plurality of probes may be included in the same network layer or data link layer packet. Or for example, all of the plurality of probes may be included in consecutive network or data link layer packets. In other embodiments, each of the plurality of probes may be transmitted at predefined intervals. For example, the second computing device may transmit one probe every 0.001, 0.005, 0.01, 0.02, 0.05, 0.1, 0.2, 0.4 or 1 seconds. In still other embodiments, the probes may be transmitted in an asynchronous manner.

In some embodiments, the second computer may repeatedly transmit a plurality of probes to the second computer. In one embodiment, the second computer may repeatedly transmit a plurality of probes to the second computer at a predefined time interval. This time interval may comprise any number of milliseconds, seconds, or minutes. For example, the second computer may transmit a probe to each of the plurality of IP addresses every second. Or for example, the second computer may transmit a probe to each of the plurality of IP addresses every tenth of a second.

In another embodiment, the second computer may transmit a plurality of probes in response to a specific event. For example, the second computer may transmit a plurality of probes upon determining that the latency of the primary connection has exceeded a given threshold. Or, for example, the second computer may transmit the plurality of probes upon determining that the reliability or quality of service of the primary connection has exceeded a given threshold. Or, for example, the second computer may transmit the plurality of probes upon receiving a request from the user, an application utilizing the primary connection, or the first computing device.

In some embodiments, the second computing device may maintain a table or other record of the transmitted probes. In one embodiment, the second computing device may maintain a table listing the serial number of each transmitted probe and a timestamp indicating when the probe was transmitted. In another embodiment, the second computing device may store a single timestamp indicating the time that a given batch of probes was sent.

In some embodiments, the order in which the probes to each IP address are sent may be determined by a pseudo-random process. In this manner, the client would not always send the first probe of a given batch of probes to the same IP address, minimizing the potential for biased results. In other embodiments, the order in which the probes to each IP address are sent may be determined in a round-robin manner.

After transmitting a plurality of probe messages to each of the plurality of IP addresses (step 305); the second computing device may receive, from the plurality of IP addresses, a plurality of responses to the plurality of probe messages (step 307). The plurality of responses may be received via any protocol. In some embodiments, the second computing device may receive a response for each probe that was transmitted. In other embodiments, the second computing device may not receive a response to one or more probes. For example, if one of the probes or responses was lost to do a routing failure, the second computing device may receive a response to a subset of the transmitted probes. In some embodiments, the second computing device may receive the plurality of responses during the establishment of the primary connection.

In some embodiments, the second computing device may compute and record a round-trip time for each IP address based on the time the response to the probe is received. The second computing device may compare the time the response to the probe was received with a timestamp recorded when the probe was sent. In other embodiments, the second computing device may record a one-way trip time for each IP address based on the time the response to the probe is received. In still other embodiments, the second computing device may compute the delta arrival times of between a plurality of responses to probes which were transmitted substantially simultaneously.

In one embodiment, the second computing device may maintain a table with a value indicating the quality of connection for each IP address. This table may then be updated each time a new round trip time is calculated for a given IP address. In this manner, the second computing device does not have to store more than a single round trip time corresponding to each IP address.

After receiving, from the plurality of IP addresses, a plurality of responses to the plurality of probe messages (step 307); one of the plurality of IP addresses may be selected for future communications between the first to the second computing device (step 309). In one embodiment, the second computing device performs the selection. In another embodiment, the first computing device performs the selection. In still another embodiment, the first and second computing devices collaboratively perform the selection. In the course of performing the selection, the first and second computing devices may transmit and share any information relating to the probes, responses, or IP addresses, including without limitation transmittal times, receipt times, computed round trip times, computed average round trip times thresholds for switching the primary connection, load indicators for one or more IP addresses, one-way measurements, clock skew measurements, and control flags to delay switching to reduce load on the primary device due to many second devices switching at the same time.

The selection may be performed based on any criteria or data, including without limitation round trip time, one-way trip time, average round trip time, reliability, and any statistical measures related to such data. In some embodiments, the selection process may also include factors such as the cost of passing traffic on an ISP corresponding to an IP address, the current load on an IP address, maintenance schedules, and past observations of failure periodicity (such as unannounced maintenance periods or times where a given network may be overloaded every day).

In one embodiment, the selection may be performed based on computing a t-test for each IP address as compared to the IP address of the connection. The t-test is a well-known statistical test found in many statistical textbooks, and is computed by dividing the difference of the means of two data sets by the square root of the sum of the variance of each data set divided by the number of data points in each set. The t-test of two data sets can be expressed by the formula $(\text{mean}_1-\text{mean}_2)/\sqrt{(\text{var}_1/n_1+\text{var}_2/n_2)}$, where $\text{mean}_1$ and $\text{mean}_2$ are the means of the respective data sets, $\text{var}_1$ and $\text{var}_2$ are the variances of the respective data sets, and $n_1$ and $n_2$ are the number of data points in each data set, respectively. The t-test allows the means of two data sets to be compared and gives a result which indicates the statistical significance of any difference in the means of the data sets. For example, the second computing device may store a number of computed round trip times for each IP address, including the IP address of the primary connection. The second computing device may then compute a t-test for the round trip times of each IP address as compared with the round trip times of the IP address of the primary connection. If an IP address is determined, with a given statistical significance, to have a faster round trip time than the primary connection, the primary connection may be transferred to the faster IP address.

In another embodiment, the selection may be performed based on computing a modified t-test for each IP address as compared to the IP address of the connection. In one embodiment, the t-test may be modified to provide time-dependence among the samples. A characteristic of the t-test is that all samples are accorded equal weight. A modified t-test may give greater weight to more recent samples, as they more accurately reflect the current state of the connection. In another embodiment, the t-test may be modified so that the second computing device does not have to store every round trip time for purposes of selecting an IP address.

In one embodiment a modified t-test may be computed using a weighted t-test, specified as follows for two IP address i and j, where sum_w is the sum of all data point weights, sum_wx[i] is the sum of the difference between each data point and the mean data value for that set of points, and sum wx2[i,j] is the sum of the squared difference between the values for the addresses i and j Let x[i] be the round trip time for the for the ith connection, and m be the average of all the x[i]. Let decay be the rate of weight decay per unit of time, and t be the time elapsed since the last batch was recorded. Then for a new batch of data the values are updated as follows:

$$\text{sum\_}w=\text{sum\_}w*\text{decay}^t+1$$

$$\text{sum\_}wx[i]=\text{sum\_}wx[i]*\text{decay}^t+(x[i]-m)$$

$$\text{sum\_}wx2[i,j]=\text{sum\_}wx2[i,j]*\text{decay}^t\}(x[i]-x[j])^2$$

Then the weighted mean round trip time difference between connection i and j and weighted standard deviation over all past data points can be computed by the following:

$$\text{mean}[i,j]=(\text{sum\_}wx[i]-\text{sum\_}wx[j])/\text{sum\_}w$$

$$\text{sdev}[i,j]=\text{sqrt}((\text{sum\_}wx2[i,j]-(\text{sum\_}wx[i]-\text{sum\_}wx[j]))*\text{mean}[i,j])/\text{sum\_}w)$$

The t-test is then used as it normally would be used, except with the weighted mean and weighted standard deviations being used in place of the regular means and deviations, and with sum_w in place of the number of data points. Explicitly, the T-statistic may then be computed as:

$$T[i,j]=(\text{mean}[i,j]-\text{threshold})/\text{sdev}[i,j]/\text{sqrt}(\text{sum\_}w))$$

If T[i,j] is greater than the value of the t distribution, then the IP address j is more than the threshold units of time faster than IP address i. It may then be determined to switch the primary connection to IP address j.

In other embodiments, any other statistical technique may be sued to compute the relative performance of each IP address.

After selecting one of the plurality of IP addresses for future communications between the first to the second computing device (step 309) the primary connection between the first and second computing devices may be transferred to the selected IP address (step 311). In one embodiment, the second computing device may initiate the transfer. In another embodiment, the first computing device may initiate the transfer. The first and second computing devices may transfer any data and resources relating to the primary connection to the connection corresponding to the selected address.

The following is an illustrative example of one embodiment of the above method being performed in the context of a client in communication with a server.

A server receives multiple IP addresses (independently of the number of physical network interfaces) and the routing is set up such that each IP address is routed via a different network provider or a different network. The routing may affect incoming packets as well as outgoing packets.

A client receives all of the server's IP addresses, and the IP addresses of the server are assumed to provide the same services.

At every time period P the client sends a batch of probe messages to the server to each of the IP addresses. A probe message is a 4 byte sequence number S that starts at 0 and is incremented every time period.

The client attempts to ensure that the probe messages in a batch are sent as close to one another as possible, such as appearing back-to-back on the network link. In addition, the client uses a pseudo-random order for the probe messages such that it doesn't always send the first probe message on the same link. Instead, assuming it has N probing connections, it will send probes on these N connections in a random (or pseudo-random) order. As the client is sending out a batch of probe messages it takes a timestamp T1.

Upon receiving a probe message, the server responds to the message by sending a copy of the message back to the client on that same connection.

Upon receiving a probe response from the server, the client takes a timestamp T2, computed the round-trip time RTT=T2−T1, and stores the round-trip time in an array RTT [S, C], where S is the sequence number and C is an identifier for the IP address from which the response was received.

When the client has received a response to every probe in a batch it updates its internal record for the quality of each connection. The RTT behavior for the current connection is compared with each alternate connection using a modified statistical t-test for paired data sets, where the RTT measurements of a single batch are the pairs. If the test shows that an alternate connection is better than the current connection by a certain threshold with a high degree of statistical significance, then the client switches IP addresses.

In some embodiments, a determination module may be used in performing the above method. The determination module may comprise any computing device, and may comprise a program, subroutine, or script configured to receive a response to each of the probe messages from each of the known IP addresses and transfer the primary connection to another of the known IP addresses of the first computing device when the determination module determines from the responses to the probe messages indicates another one of the known IP addresses exceeds a predetermined performance characteristic.

Figure 4:
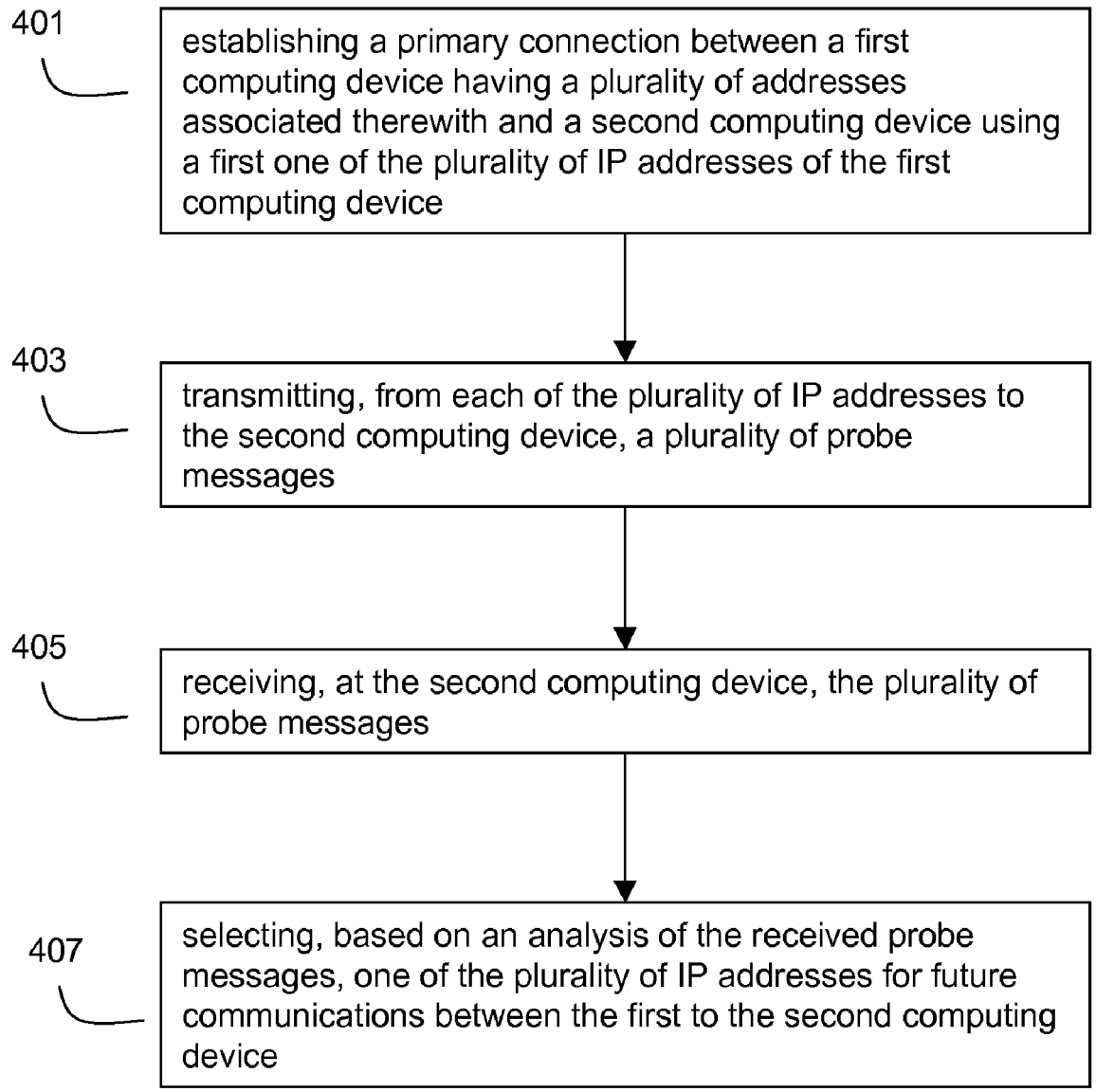
FIG. 4 is flow diagram of a second method for determining a communication path between a first computing device and a second computing device is shown.

Referring now to FIG. 4, a second method for determining a communication path between a first computing device and a second computing device is shown. In brief overview, the method comprises: establishing a primary connection between a first computing device having a plurality of addresses associated therewith and a second computing device using a first one of the plurality of IP addresses of the first computing device (step 303); transmitting, from each of the plurality of IP addresses to the second computing device, a plurality of probe messages (step 403); receiving, at the second computing device, the plurality of probe messages (step 405); and selecting, based on an analysis of the received probe messages, one of the plurality of IP addresses for future communications between the first to the second computing device (step 407).

Still referring to FIG. 4, now in greater detail, a primary connection is established between a first computing device having a plurality of addresses associated therewith and a second computing device using a first one of the plurality of IP addresses of the first computing device (step 303). This step may be performed in accordance with any of the embodiments described herein.

After establishing the primary connection, the first computing device may transmit, from each of the plurality of IP addresses to the second computing device, a plurality of probe messages (step 403). These probe messages may comprise any probe messages described herein, and may be transmitted in any manner described herein. In one embodiment, the plurality of probes may be transmitted at substantially the same time.

After transmitting, from each of the plurality of IP addresses to the second computing device, a plurality of probe messages (step 403); the second computing device may receive each of the plurality of probe messages (step 405). The second computing device may receive the probes in any manner described herein, and may maintain any record of the probes and the receipt as described herein. In one embodiment, the second computing device may compare the relative arrival times of the plurality of probes.

After the probes are received, selecting, based on an analysis of the received probe messages, one of the plurality of IP addresses for future communications between the first to the second computing device (step 407). In one embodiment, an IP address may be selected based on a t-test or modified t-test performed using the relative arrival times of the probes.

The primary connection may then be transferred to one of the plurality of IP addresses, in response to a determination that one of the IP addresses is performing significantly better than the primary connection.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for determining a communication path between a first computing device and a second computing device, the method comprising:

(a) receiving, at a second computing device, a plurality of IP addresses for a first computing device, the first and second computing devices being endpoint computing devices that communicate with one another over a network;
(b) establishing a primary connection between the first and second computing devices using a first one of the plurality of IP addresses of the first computing device;
(c) transmitting, from the second computing device, a plurality of probe messages to each of the plurality of IP addresses of the first computing device;
(d) receiving, at the second computing device from each of the plurality of IP addresses of the first computing device, a plurality of responses to the plurality of probe messages;
(e) analyzing, at one of the first and second endpoint computing devices, at least one of the plurality of probe messages or the plurality of responses to the plurality of probe messages; and
(f) selecting, based on the analysis, one of the plurality of IP addresses of the first computing device for future communications between the first to the second computing devices.

2. The method of claim 1 further comprising the step of transferring the primary connection between the first and second computing devices to the selected IP address.

3. The method of claim 1 wherein step (b) comprises establishing, by the second computing device, a primary connection between the first and second computing devices using a first one of the plurality of IP addresses.

4. The method of claim 1 wherein step (b) comprises establishing, by the first computing device, a primary connection between the first and second computing devices using a first one of the plurality of IP addresses.

5. The method of claim 1 wherein step (e) comprises analyzing the timing of the probe messages.

6. The method of claim 1 wherein step (e) comprises analyzing the timing of the plurality of received responses.

7. The method of claim 1 wherein step (c) comprises periodically transmitting, from the second computing device, a plurality of probe messages to each of the plurality of IP addresses.

8. The method of claim 1 wherein step (c) comprises transmitting, from the second computing device, a plurality of probe messages to each of the plurality of IP addresses, wherein each of the plurality of messages is transmitted at substantially the same time.

9. The method of claim 1 wherein step (f) comprises selecting, by the second computing device, one of the plurality of IP addresses for future communications between the first to the second computing device.

10. The method of claim 1 wherein step (f) comprises selecting, by the first computing device, one of the plurality of IP addresses for future communications between the first to the second computing device.

11. The method of claim 1 wherein step (f) comprises selecting, by cooperation of the first computing device and second computing device, one of the plurality of IP addresses for future communications between the first to the second computing device.

12. The method of claim 1 wherein the analyzing comprises performing a statistical t-test to compare a mean of a data set associated with the IP address of the primary connection with a mean of a data set associated with a second one of the plurality of IP addresses.

13. The method of claim 12 wherein the statistical t-test is modified to give greater weight to certain data.

14. A method for determining a communication path between a first computing device and a second computing device, the method comprising:
  (a) establishing a primary connection between a first computing device having a plurality of IP addresses associated therewith and a second computing device using a first one of the plurality of IP addresses of the first computing device, the first and second computing devices being endpoint computing devices that communicate with one another over a network;
  (b) receiving, at the second computing device from each of the plurality of IP addresses of the first computing device, a probe message;
  (c) analyzing, at the second computing device, the plurality of received probe messages; and
  (d) selecting, based on the analysis of the plurality of received probe messages, one of the plurality of IP addresses of the first computing device for future communications between the first to the second computing device.

15. The method of claim 14 wherein the selecting is performed by the second computing device.

16. The method of claim 14 wherein the selecting is performed by the cooperation of the first computing device and the second computing device.

17. The method of claim 14 wherein the analyzing comprises performing a statistical t-test to compare a mean of a data set associated with the IP address of the primary connection with a mean of a data set associated with a second one of the plurality of IP addresses.

18. The method of claim 17 wherein the statistical t-test is modified to give greater weight to certain data.

19. The method of claim 14 wherein the establishing comprises establishing the primary connection by the second computing device.

20. The method of claim 14 wherein the establishing comprises establishing the primary connection by the first computing device.

21. A method for determining a communication path between a first computing device and a second computing device, the method comprising:
  (a) establishing a primary connection between a first computing device having a plurality of IP addresses associated therewith and a second computing device using a first one of the plurality of IP addresses of the first computing device, the first and second computing devices being endpoint computing devices that communicate with one another over a network;
  (b) receiving, from the second computing device at each of the plurality of IP addresses of the first computing device, a probe message;
  (c) analyzing, at the first computing device, the plurality of received probe messages; and
  (d) selecting, based on the analysis of the plurality of received probe messages, one of the plurality of IP addresses of the first computing device for future communications between the first to the second computing device.

22. A system for determining a communication path between a first computing device and a second computing device, the system comprising:
  (a) a first computing device having a plurality of IP addresses that define the location of the first computing device on a network, the first computing device being an endpoint computing device on the network and comprising a responder configured to respond to a message received at each of the plurality of IP addresses; and
  (b) a second computing device in communication with the first computing device via the network using one of the IP addresses of the first computing device to establish a primary connection, the second computing device being an endpoint computing device on the network and comprising:
    (i) a receiver for receiving an identification of the plurality of IP addresses of the first computing device;
    (ii) a transmitter for transmitting a probe message to each of the plurality of IP addresses of the first computing device; and
    (iii) a determination module configured to receive a response to each of the probe messages from each of the plurality of IP addresses of the first computing device and to transfer the primary connection to another one of the IP addresses of the first computing device when the determination module determines from the responses to the probe messages that the other one of the IP addresses of the first computing device exceeds a predetermined performance characteristic.

23. A non-transitory computer readable medium having executable instructions embodied therein to determine a communication path between a first computing device and a second computing device, the computer readable medium comprising:
  (a) instructions to receive, at a second computing device, a list of two or more known IP addresses of a first computing device, the first and second computing devices being endpoint computing devices that communicate with one another over a network;
  (b) instructions to establish a primary connection between the first and second computing devices using a first one of the IP addresses of the first computing device identified in the list;
  (c) instructions to transmit a plurality of probe messages from the second computing device to each of the known IP addresses of the first computing device;
  (d) instructions to receive, at the second computing device from each of the known IP addresses of the first computing device, a plurality of responses to the plurality of probe messages;
  (e) instructions to select an IP address of the first computing device to use based on an analysis, at the second computing device, of the received responses; and
  (f) instructions to transfer the primary connection between the first and second computing devices to the selected IP address of the first computing device.

24. The non-transitory computer readable medium of claim 23 wherein the instructions to transfer are executed when the second computing device requests data from the first computing device.

* * * * *